United States Patent [19]

Stover, Jr. et al.

[11] 4,372,198

[45] Feb. 8, 1983

[54] LANTERN HOT PLATE

[76] Inventors: Henry D. Stover, Jr., c/o George Spector, 3615 Woolworth Bldg., 233 Broadway; George Spector, 3615 Woolworth Bldg., 233 Broadway, both of New York, N.Y. 10007

[21] Appl. No.: 253,618

[22] Filed: Apr. 13, 1981

[51] Int. Cl.³ .............................................. A47J 37/00
[52] U.S. Cl. ...................................... 99/340; 99/357; 99/422; 126/258; 362/179
[58] Field of Search ................ 99/340, 357, 422, 425, 99/447, 449; 126/258, 256, 260, 47, 48; 362/157, 163, 180, 179

[56] References Cited

U.S. PATENT DOCUMENTS

| 189,968 | 4/1877 | Tobey | 126/258 |
| 1,529,408 | 3/1925 | Coleman | 99/422 X |
| 1,585,106 | 5/1926 | Pederson | 126/258 X |
| 1,681,142 | 8/1928 | Wolcott | 99/422 X |
| 1,736,223 | 11/1929 | Silen | 99/422 |
| 3,408,998 | 11/1968 | Brancato | 126/47 X |
| 3,804,075 | 4/1974 | Rummel | 126/258 |
| 4,029,079 | 6/1977 | Elder | 126/258 |
| 4,091,795 | 5/1978 | Wells | 126/258 |

Primary Examiner—Billy J. Wilhite

[57] ABSTRACT

A hot plate that is readily placeable upon a lantern in order to use the lantern heat for cooking foods upon the hot plate, the hot plate including a grill, and which in one design of the invention, additionally includes a wrap around side wall placeable around the grill and a cover fitted on a top edge of the wall, so to form an oven over the grill.

2 Claims, 4 Drawing Figures

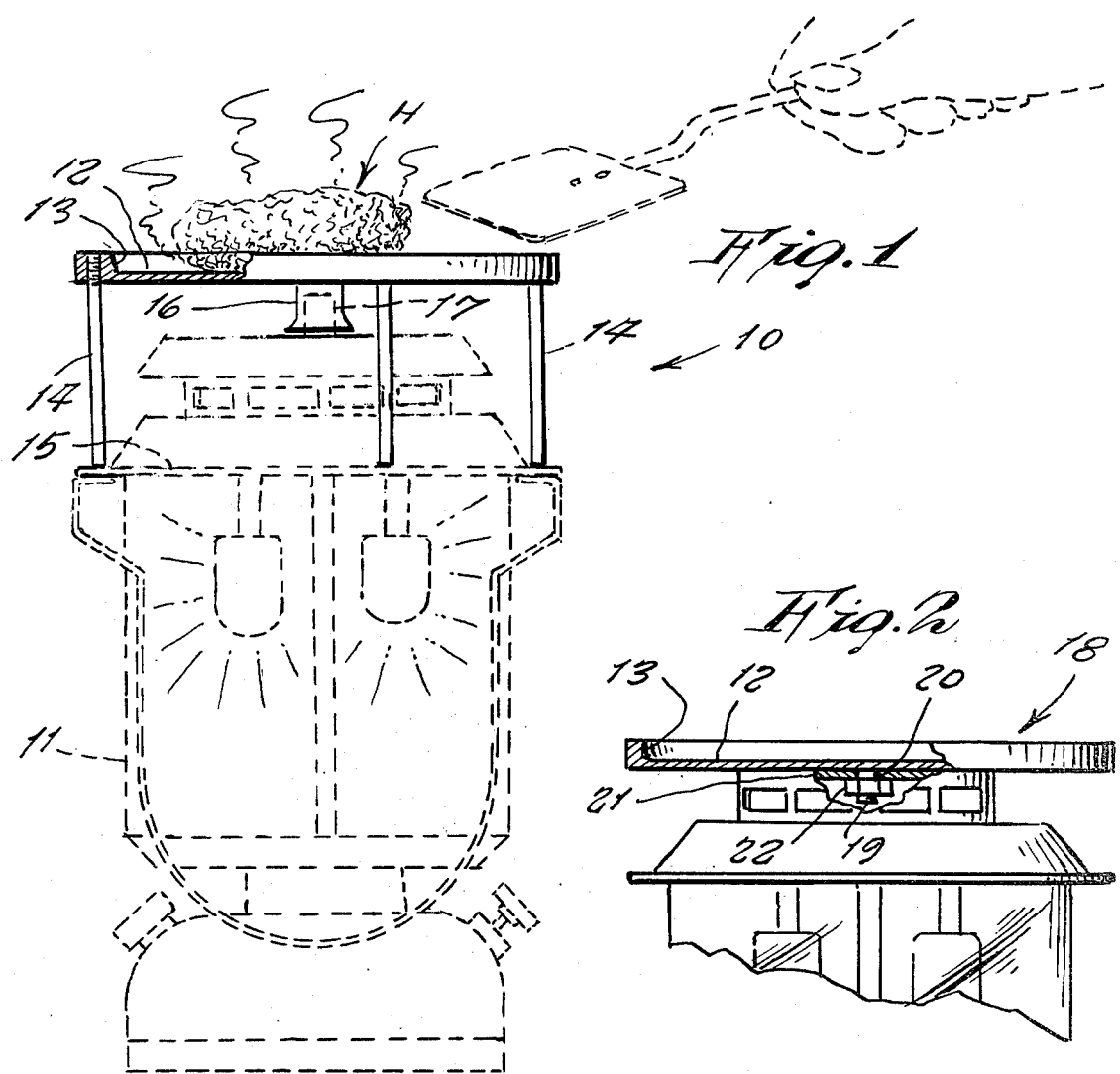
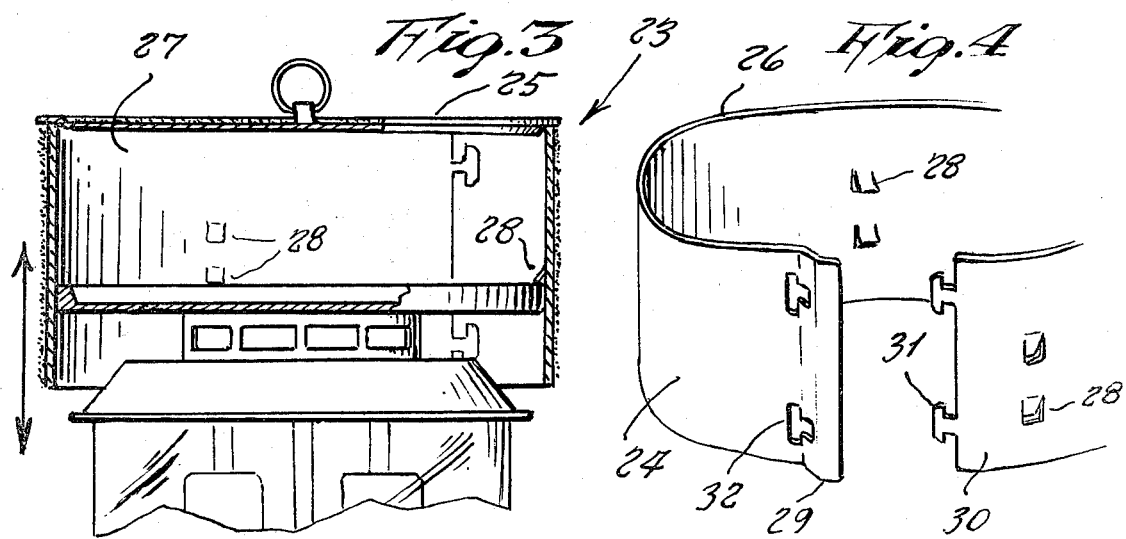

LANTERN HOT PLATE

This invention relates generally to out of doors camping equipment. More specifically to cooking grills.

It is well known to most campers that making a fire out of doors, for cooking purposes, can at times be an excessive chore, particularly when the weather is disagreeable, or when the amount of food cooking or heating is relatively little. This situation is accordingly in need of an improvement.

Therefore it is a principal object of the present invention to provide a means of heating or cooking of foods over a lantern such as is userally taken along on camping trips for illumination purposes in a tent after evening darkness sets in.

Another object is to provide a heating and cooking means which can include the grilling of foods as well as baking or oven roasting.

Yet another object is to provide a lantern hot plate which is readily removable from the lantern when not needed, but which in use, does not interfer with the illumination therefrom.

FIG. 1 is a side view of one design of the invention which is placeable on top of a lantern.

FIG. 2 is a side view of another design of the invention which is secured integrally with the top of the lantern.

FIG. 3 is a side cross sectional view of still another design of the invention which additionally includes a removable collar and lid so to form an adjustable sized oven on top of the hot plate.

FIG. 4 is a perspective view of the removable collar.

Referring now to the drawing in greater detail, and more particularly to FIG. 1 thereof, at this time, the reference numeral 10 represents a lantern hot plate, according to the present invention, which is designed for fitting on top of a lantern 11. The hot plate is made of a circular metal plastic 12 including an upward, peripheral lip 13. Downward legs 14 screw threaded in the lip serve to rest upon the peripheral flange 15 of the lantern, while a downward cup 16 affixed to an underside center of the plate 12 receives an upward central post 17 of the lantern for preventing the hot plate from slipping sidewardly off the lantern.

The upward lip 13 prevents frying grease from running off the plate and down on the lantern such as when cooking hambergers H or the like, as shown in FIG. 1.

The lantern hot plate 18, shown in FIG. 2, includes metal plate 12 with lip 13. A downward bolt 19 welded to an underside center of the plate 12 is receivable through a hole 20 in a center of latern top wall 21 and is then fitted with a nut 22 bearing against the underside of the wall 21, thus rigidly securing the hot plate upon the lantern.

As shown in FIGS. 3 and 4, the hot plate may be selectively made into a baking oven 23 by simply wrapping a sheet metal, side wall collar 24 around the hot plate lip 13 and then resting a sheet metal lid 25 upon a top edge 26 of the side wall, in order to form an interior oven chamber 27, that is selectively variable in height by means of horizontal rows of inwardly bent tabs 28 punched in the side wall and which rest upon the top edge of lip 13 when the opposite ends 29 and 30 of the side walls are drawn toward each other and secured together by T-shaped lugs 31 snap fitted in T shaped slots 32.

In use access to the over interior is made by simply lifting the lid.

It should be understood that numerous modifications may be made within the scope of this invention and that the invention scope is not limited to the preferred forms depicted herein.

While various changes may be made in the detail construction, it is understood that such changes will be within the spirit and scope of the present invention as is defined by the appended claims.

What is claimed:

1. A lantern hot plate, comprising in combination, a circular metal plate, an upward peripheral lip forward on said metal plate, a lantern and means for securement of said metal plate upon a top of said lantern, wherein said hot plate includes oven means for converting said hot plate into an adjustable oven, wherein means under center of said metal plate prevent sideward shift of said hot plate upon said lantern, wherein said oven means comprises a cylindrical member having vertically spaced tabs adapted to engage said plate at various levels whereby said member encircles said plate and extends thereabove at various levels.

2. A device as in claim 1, wherein said member is formed from a flexible sheet having interlocking end components, in further combination with removable cover, said member includes a lower portion extending below said plate and encircles a portion of the lantern.

* * * * *